United States Patent [19]

Larsen et al.

[11] Patent Number: 5,540,833
[45] Date of Patent: Jul. 30, 1996

[54] SULFUR TOLERANT BIMETALLIC ZEOLITIC REFORMING CATALYSTS

[75] Inventors: Gustavo Larsen, New Haven; Gary L. Haller, Hamden, both of Conn.; Daniel E. Resasco, Media; Vincent A. Durante, West Chester, both of Pa.

[73] Assignee: Sun Company, Inc. (R&M), Philadelphia, Pa.

[21] Appl. No.: 189,268

[22] Filed: Jan. 31, 1994

Related U.S. Application Data

[63] Continuation of Ser. No. 910,069, Jul. 8, 1992, abandoned.

[51] Int. Cl.$^6$ .......................... C10G 35/09; C10G 35/095; B01J 29/068
[52] U.S. Cl. ........................... 208/137; 208/134; 502/66; 502/74; 585/407; 585/419; 585/660
[58] Field of Search ...................... 502/66, 74; 585/407, 585/417, 418, 419, 658, 660; 423/328.1; 208/134, 135

[56] References Cited

U.S. PATENT DOCUMENTS

| | | | |
|---|---|---|---|
| 4,104,320 | 8/1978 | Bernard et al. | 260/673.5 |
| 4,443,326 | 4/1984 | Field | 208/64 |
| 4,456,527 | 6/1984 | Buss et al. | 208/89 |
| 4,615,793 | 10/1986 | Jossens | 208/138 |
| 4,650,565 | 3/1987 | Jacobson et al. | 208/138 |
| 4,680,280 | 7/1987 | Pandey et al. | 502/66 |
| 4,897,177 | 1/1990 | Nadler | 208/79 |

FOREIGN PATENT DOCUMENTS 0258127  3/1988  European Pat. Off. .

OTHER PUBLICATIONS

Vaarkamp, et al., "The Sulfur Poisoning of Pt/BaKL Catalyst" A Structural Study Using X-ray Abostorption Spectroscopy, abstract D19, *12th North American Meeting of the Catalysis Society*, Lexington, KY, May, 1991.

Kao et al., "Effect of Sulfur on the Performance of Pt/KL Hexane Aromatization Catalyst", abstract D20, *12th North American Meeting of the Catalysis Society*, Lexington, KY, May, 1991.

McVicker et al., "Effect of Sulfur on the Performance and on the Particle Size and Location of Platinum in Pt/KL Hexane Aromatization Catalysts", submitted to *J. Catal.*

Jentys et al., "Temperature–Programmed Reduction of Silica–Supported Pt/Ni Catalysts Studied by XANES", *J. Phys. Chem.*, 96, 1324–1328 (1992).

Raab et al., "Preparation and Characterization of Silica Supported Ni/Pt Catalysts", *J. Catal.*, 122, 406–414 (1990).

Hong et al., "Aromatization of n–Hexane by Platinum–Containing Molecular Sieves", *J. Catal.*, 134, pp. 349–358 (1992).

Iglesia et al., "A Mechanistic Proposal for Catalytic Dehydrocyclinzation Rates on Pt/L–Zeolite. Inhibited Deactivation of Pt sites Within One–Dimensional Channels", abstract B25, *12th North American Meeting of the Catalysis Society*, Lexington, KY, May, 1991; American Chemical Society Meeting Abstracts, Aug., 1991.

Iglesia et al., "A Chechanistic Proposal for Alkane Dehydrocyclization Rates on Pt/L–Zeolite. Inhibited Deactivation of Pt Sites within Zeolite Channels", to be published, *Proc. 10th Intern. congr. Catal.*, Budapest, Jul., 1992.

Huges et al., "Aromatization of Hydrocarbons over Platinum Alkaline Earth Zeolites", *Stud. Survace Sci. Catal.*, 28, 725–731 (1986).

Tzou et al., "Chemical Anchoring of Platinum in Zeolites", *Appl. Catal.*, 20, 231–238 (1986).

Balse et al., "Mossbauer Spectroscopy Studies of PtFe/Na Y Zeolite", *Catalysis Lett.*, 1, 275–281 (1988).

Tzou et al., "EXAFS Studies of Rh/NaY and RhCr/NaY Zeolite Catalysts: Evidence for Direct Bonding between Metal Particles and Anchoring Ions", *Langmuir*, 2, 773–776 (1986).

Larsen et al., "Characterization of Pt–Ni/KL–zeolite Bimetallic Catalysts by Chemisorption, Catalysis and X–ray Absorption", to be published in the *Proc. 9th Intern. Zeolite conf.*, Montreal, Jul. 1992.

Kip et al, "Determination of Metal particle Size of Highly Dispersed Rh, Ir, and Pt Catalysts by Hydrogen Chemisorption and EXAFS", *J. Catal.*, 105, 26–38 (1987).

P. W. Tamm, d. H. Moh and C. R. Wilson, Catalysis 1987, J. W. Ward, Ed. Elsevier Science Publishers B V. Amsterdam, 1988, pp. 335–353.

J. R. Bernard, Proc. 5th Intern., Conf. Zeolites (L. V. C. Rees, ed.) Heyden, London, 1980, p. 686 (see attached pp. 5 and 6).

*Primary Examiner*—Ponnathapura Achutamurthy
*Attorney, Agent, or Firm*—Q. Todd Dickinson; Stephen T. Falk

[57] ABSTRACT

New compositions of matter comprise a metal from the group consisting of platinum, rhodium and palladium, a metal from the first row of Group VIII of the Periodic Table and a nonacidic L-zeolite. A preferred composition is Pt—Ni/KL-zeolite. Such catalysts are prepared by coimpregnation of the zeolite with the metals. Methods of using the catalysts in reforming, aromatization or dehydrogenation are provided.

9 Claims, No Drawings

SULFUR TOLERANT BIMETALLIC ZEOLITIC REFORMING CATALYSTS

This is a continuation of application Ser. No. 07/910,069 filed on Jul. 8, 1992 now abandoned.

BACKGROUND OF THE INVENTION AND PRIOR ART

Pt/L-zeolite catalysts have utility as non-acidic reforming catalysts for the octane enhancement by selective reforming of light paraffins, see P. W. Tamm et al, Catalysis 1987, J. W. Ward, Ed., Elsevier Science Publishers, B. V. Amsterdam, 1988, page 335 and Buss et al, U.S. Pat. No. 4,456,527, 1984. They are also prospective catalysts for the conversion of n-hexane to benzene, see Bernard, Proc. 5th Intern. Conf. Zeolites (L. W. Rees, Ed.) Heyden, London, 1980, page 686 and Bernard et al U.S. Pat. No. 4,104,320 (1978). The catalysts described in the latter two references were based on wide pore L-zeolite loaded with Pt particles, Pt/KL-zeolite, and those described in the first two references above were similar, but part of the $K^+$ had been exchanged by $Ba^{+2}$, Pt/BaKL-zeolite. However, both the Pt/BaKL-zeolite and Pt/KL-zeolite have low sulfur tolerance according to Tamm et al supra and it has recently been demonstrated for both catalysts that sulfur promotes the migration of Pt out of the zeolite pores and the aggregation of larger particles, see Vaarkamp et al, "The Sulfur Poisoning of Pt/BaKL Catalysts", abstract D19, 12th North American Meeting of the Catalysis Society, Lexington, Ky., May 1991 and Kao et al, "Effect of Sulfur on the Performance of Pt/KL Hexane Aromatization Catalysts", abstract D20, 12th North American Meeting of The Catalysis Society, Lexington, Ky., May, 1991. Pandey et al U.S. Pat. No. 4,680,280 (1987) discloses L-zeolite catalysts which incorporate one of the desulfurization metals, molybdenum, chromium or tungsten to improve sulfur tolerance.

Bimetallic Pt—Ni catalysts using other supports, e.g. Pt—Ni/$SiO_2$ are reported by Jentys et al, J. Phys. Chem., 96, 1324 (1992) and Raab et al, J. Catal., 122, 406 (1990) and others as discussed infra. However, silica, alumina or carbon supported catalysts as described in the prior art are of quite low dispersion compared to the catalysts of the invention as disclosed infra.

It is known in the art that the retention of Pt in the KL-zeolite pores of of monometallic Pt/KL-zeolite catalysts is essential for high activity and selectivity, and for maintenance of high activity and selectivity, see Kao et al supra, and Iglesia et al, "A Mechanistic Proposal for Alkane Dehydrocyclization Rates on Pt/L-zeolite. Inhibited Deactivation of Pt Sites within Zeolite Channels", to be published, Proc. 10th Intern. Congr. Catal. Budapest, July 1992, and that self-deactivation of Pt/$SiO_2$ makes such catalysts inferior to Pt/KL-zeolite, see Iglesia et al supra, even though their initial activities are comparable.

While conventional reforming catalysts are bi-functional in that they utilize support acidity as well as metal dehydrogenation/hydrogenation functionality, it has been demonstrated, see Bernard supra, that Pt/L-zeolite reforming catalysts may accomplish aromatization using Pt-only functionality and the acidity can be detrimental to optimum performance. The low sulfur tolerance of Pt/L-zeolite catalyst is known, see Bernard et al supra, but recently it has been demonstrated that the effect of sulfur is not the result of simple poisoning, see Vaarkamp et al, Kao et al supra. By mechanisms which are not fully understood, sulfur promotes Pt crystal growth and movement of Pt out of the zeolite channels.

The sulfur intolerance of Pt/L-zeolite catalyst is one of the major inhibitions to the commercial use of these catalysts for petroleum reforming or for the production of benzene or other aromatics. Thus, it is of interest to find catalyst modifiers which might stabilize Pt against crystal growth. One approach is to use first row cations to anchor Pt particles in Y-zeolite using $Fe^{2+}$, see Tzou et al, Appl. Catal. 20, 231 (1986) and Balse et al, Catalysis Lett., 1, 275 (1988). Also, $Cr^{3+}$ has been used to anchor Rh particles in Y-zeolite, see Tzou et al, Langmuir, 2, 773 (1986).

SUMMARY OF THE INVENTION

According to this invention, the disadvantages of prior catalysts are overcome by a new composition of matter comprising a metal selected from the group consisting of platinum, rhodium and palladium and a first row Group VIII metal, namely iron, cobalt or nickel, preferably nickel, supported within the pores of L-zeolite in a basic form, with alkali metal or alkaline earth metal counter ions, preferably potassium as in KL-zeolite.

In the compositions according to the invention, the metallic cluster size is constrained by the zeolite pore size to be <13 Angstroms. To the best of our knowledge, platinum-nickel clusters having the required size for our unique compositions have not previously been prepared.

The preparation of the catalysts according to the invention is accomplished by preparing in known manner a nonacidic L-zeolite containing basic groups such as alkali metal or alkaline earth metal, and co-impregnating the non-acidic L-zeolite with platinum, rhodium or palladium and a metal from the top row of Group VIII metals. The co-impregnation is done by contacting the solid zeolite with an aqueous solution of platinum for example and a top-row Group VIII metal compound, followed by drying the zeolite by known procedures. When used for dehydrogenation, the zeolite is then preferably sulfided and further treated as subsequently described in the examples.

The proportions of the metals in the compositions according to the invention are those typical for bimetallic platinum catalysts or the like, as disclosed for example in patents referred to herein.

The catalysts of the invention are useful as catalysts in the reforming, aromatization or dehydrogenation of hydrocarbons. In certain embodiments of the invention, therefore, processes of reforming, aromatization and dehydrogenation are performed according to well-known conditions for those reactions, but employing in place of conventional catalysts for those reactions, the novel catalysts according to the invention.

In using the catalysts of the invention in reforming, or dehydrocyclization of aliphatic hydrocarbons, known conditions for such reactions may be employed such as those disclosed in Bernard U.S. Pat. No. 4,104,320, issued Aug. 1, 1978, and Buss et al U.S. Pat. No. 4,456,527, issued May 20, 1986, the disclosures of which are hereby incorporated by reference. In using the catalysts for dehydrogenation, for example of isobutane to isobutene, known conditions for such reactions may be used such as those employed in Miller U.S. Pat. No. 4,727,216 issued Feb. 23, 1992, the disclosure of which is hereby incorporated by reference. The catalysts may be sulfided by known procedures to obtain optimum activity.

EXAMPLES

The following examples illustrate the invention:

Example 1

A catalyst was prepared containing Pt on potassium zeolite, identified below as Pt/KL. Three catalysts were prepared containing Pt and Ni in various proportions on potassium zeolite, identified below as 0.70 Pt—Ni/KL, 0.53 Pt—Ni/KL and 0.44 Pt—Ni/KL. Table 1 below gives the compositions of these four catalysts.

The catalysts were prepared from KL-zeolite by co-impregnation using a ratio of 5.0 ml/6.5 g KL-zeolite with appropriate amounts of $Ni(NO_3)_2$ and $Pt(NH_3)_4(NO_3)_2$ to yield the desired metal loadings. The zeolite had been calcined prior to impregnation overnight (12 hours + or − 2 hours) at 500° C. The impregnated material is first oven-dried at 110° C. for 2 to 4 hours and then placed in the reduction cell. The calcination temperature (pure $O_2$, 500 ml/g-min) is achieved by applying a heating ramp of 1° C./min, held at 450° C. for 1 hour. The bed is purged with a high flow of He (500 ml/g-min) while ramping the temperature to 500° C. in 1 hour. At that point, the flow is switched to $H_2$ (same flowrate as that of either $O_2$ or He) and the temperature is held at 500° C. for 8 hours. Then the system is cooled to room temperature and air is allowed to slowly diffuse into the reduction cell prior to catalyst storage. The monometallic Pt catalyst is labeled Pt/KL while the bimetallic catalysts are referred to as Pt—Ni/KL with the Pt mole fraction indicated, e.g., 0.70 Pt—Ni/KL designates the catalyst which is 70% Pt and 30% Ni.

Preliminary work on co-ion exchanged and sequential ion exchanged (Pt ion exchange and reduction followed by Ni ion exchange and reduction) had not been successful as judged by the very poor $H_2$ chemisorption measured dispersion that resulted. However, co-impregnation preparation resulted in reasonable dispersions even when Pt loading exceeded 5 wt %. These catalysts were sulfided with dimethyl sulfoxide. The catalysts were re-reduced at 500° C. for one hour in a 100 cc/min flow of $H_2$, dimethyl sulfoxide was injected (200μl per 1 g of catalyst or a S/Pt exposure ratio of about 10), followed by a further 2 hours of stripping in $H_2$ flow at 500° C. The catalyst is identified by the atomic fraction of Pt, e.g. 0.44 Pt—Ni/KL, and the sulfided catalysts with the further prefix, e.g. S, 0.44 Pt—Ni/KL.

TABLE 1

| Catalyst | Catalyst composition | | | |
|---|---|---|---|---|
| | H/M | wt % Pt | wt % Ni | XPt |
| Pt/KL | 0.58 | 5.31 | — | 1.00 |
| 0.70 Pt—Ni/KL | 0.50 | 5.43 | 0.71 | 0.70 |
| 0.53 Pt—Ni/KL | 0.45 | 5.02 | 1.33 | 0.53 |
| 0.44 Pt—Ni/KL | 0.39 | 5.12 | 1.93 | 0.44 |

The sulfided catalysts were examined by TEM (Phillips EM 410 electron microscope, bright field mode, 153,000 magnification). All four sulfided catalysts were examined in duplicate. While a careful statistical particle size was not determined, most particles were in the range of 10–30 nm on the S, Pt/KL catalyst and 1–3 nm on the three S, Pt—Ni/KL catalysts.

Example 2

The Pt only and the highest Ni loaded catalysts from Example 1 were submitted to extended X-ray absorption fine structure (EXAFS) analysis. These results are reported in Table 2 below. The coordination number $N_{Pt-Pt}=7.1$ is consistent with a particle size of about 1.2 nm for Pt/KL which grows to $N_{Pt-Pt}=9.0$ equivalent to about a particle size of about 2.0 nm, see Kip et al, J. Catal., 105, 26 (1987). Thus, the EXAFS confirms that particle size increases with sulfiding. Combining the EXAFS with the TEM, our results suggest a bimodal distribution of particles within the zeolite channels (mostly not seen in the TEM and of order 1.2 nm) and particles outside the zeolite and about 25 nm. From a simple volume average mass balance (assuming that the large particles outside the zeolite have a $N_{Pt-Pt}=12$), one finds that about 40% of the Pt has migrated outside the zeolite. Even though the particle size is larger following sulfiding (which usually implies more ordered particles), one should also note that the $DW_{Pt-Pt}$ has increased indicating that sulfiding causes disorder as well as particle growth but note also that the $R_{Pt-Pt}$ is identical to that of bulk Pt, $R_{Pt-Pt}=0.277$ nm.

TABLE 2

EXAFS determined coordination number, $N_{x-y}$, interatomic distance, $R_{x-y}$, in nm, and Debye Waller term, $DW_{x-y}$ in $A^2$ (where X is the absorber and Y is the scatter)

| | Pt/KL | S, Pt/KL | 0.44 Pt—Ni/KL | S, 0.44 |
|---|---|---|---|---|
| $N_{Pt-Pt}$ | 7.1 | 9.0 | 3.8 | 3.6 |
| $N_{Pt-Ni}$ | | | 1.6 | 1.8 |
| $N_{Ni-Ni}$ | | | 3.9 | 4.1 |
| $N_{Ni-Pt}$ | | | 1.4 | 1.8 |
| $R_{Pt-Pt}$ | 0.277 | 0.277 | 0.272 | 0.272 |
| $R_{Pt-Ni}$ | | | 0.263 | 0.264 |
| $R_{Ni-Ni}$ | | | 0.254 | 0.254 |
| $R_{Ni-Pt}$ | | | 0.263 | 0.264 |
| $DW_{Pt-Pt}$ | 0.0005 | 0.0010 | 0.0032 | 0.0028 |
| $DW_{Pt-Ni}$ | | | 0.0017 | 0.0027 |
| $DW_{Ni-Ni}$ | | | 0.0017 | 0.0020 |
| $DW_{Ni-Pt}$ | | | −0.0009 | 0.0036 |

The bimetallic EXAFS results must be interpreted with some caution because the analysis is complicated by a total of 14 parameters (the 12 shown in Table 2 plus $E_0$ for both the Pt $L_{III}$ and NiK edges). Seven of these must be simultaneously varied for each edge spectrum to obtain a fit of the data to a model. One variable can be eliminated by requiring that $R_{Pt-Ni}=R_{Ni-Pt}$, but there may still be several local minima in the fit. Moreover, there is no simple relationship between the coordination numbers of the bimetallic particles and their size since this will depend on the structure. One can say that the particles are bimetallic since the $R_{Ni-Ni}=0.263$ nm is significantly different from bulk Ni where it is 0.245 nm and that the bimetallic clusters are not homogeneous since this would require that $N_{Pt-Pt}=N_{Pt-Ni}$ and $N_{Ni-Ni}=N_{Ni-Pt}$ for a 1:1 Pt:Ni ratio, which they clearly are not. The fact that neither $N_{Pt-Pt}+N_{Pt-Ni}$ nor $N_{Ni-Ni}+N_{Ni-Pt}$ change much with sulfiding is consistent with the TEM finding that the particle size does not grow with sulfiding. Note also that the Debye Waller terms for all the bimetallic (except one) are greater than that for Pt/KL would be consistent with bimetallic clusters since they are expected to have more disorder than a single phase. (The $DW_{Ni-Pt}=0.0009$ is probably in error since it implies that the disorder, from the perspective of the Ni absorber in the bimetallic, is less than in the bulk Ni reference which is not physically reasonable.)

Example 3

The reaction of n-hexane was investigated at below atmospheric pressure over a period of time on stream from 15 to 135 minutes at low and at high conversion. From a kinetic point of view, differential rates allow specific rates to be estimated at the low conversion. However, the selectivity increases monotonically with conversion so that from a practical point of view one would wish to compare the selectivity at high conversion. Because one observes integral rates at high conversion, it is not possible to extract a true kinetic rate ratio without obtaining detailed kinetics over the whole range of conversion. There is the further complication that the catalysts suffer significant deactivation with time on stream. The deactivation appears to mostly be the result of coke deposition on the metal because reactivation by simple re-reduction produced about an 80% recovery of the initial rate. A further indication that the deactivation is primarily the result of coke deposition on the metal is evident when the deactivation is compared on the sulfided and unsulfided catalysts (at both low and high conversion). The unsulfided catalysts lose about 50–60% of their activity in the first 135 min on stream, but the sulfided catalysts lose $\leq 10\%$ of their activity in the same period. A selection of data is presented in Table 3 at 75 minutes on stream, a period after which most of the deactivation has occurred.

At low conversion, the sulfided catalysts suffer a large loss of the desired selectivity to benzene because hexene, $C_6=$, formation competes. However, at high conversion there is little decrease in the benzene selectivity. This is, in some sense, reassuring since low pressure reaction studies may be suspect because they may involve a component of gas phase cyclization (of hexatriene) which can be suppressed at high $H_2$ pressure. The fact that sulfiding preferentially suppresses benzene formation relative to hexene formation at low conversion suggests that the gas phase contribution is small in these experiments if it can be assumed that dehydrogenations subsequent to hexene formation track hexane dehydrogenation.

We believe [16] that a linear relation between EXAFS coordination number and H/Pt that exists for catalyst loadings between 0.98 and 3.5 wt % Pt breaks down for the 5.31 wt % Pt/KL of Table 1 above and implies pore blockage. The incremental pore blockage that would then result by addition of more metal (Ni) in the bimetallic catlysts would then explain why H/M decreases with added Ni. Since the turnover frequencies given here are normalized to H/M, they should already account for pore blockage and the decrease in turnover frequency with increased Ni indicates that the bimetallic clusters are slightly less active than pure Pt clusters for reactions of n-hexane. However, the relative activities per unit mass of catalyst (last column of Table 3) indicate that the improved sulfur tolerance of the bimetallics (measured at either low or high conversion) is improved by almost one order of magnitude in the 0.44 Pt—Ni/KL catalyst relative to Pt/KL and that the sulfur tolerance increases monotonically with added Ni. Of course, this sulfur tolerance may be due to either a resistance to sulfur induced sintering (clearly evidenced in both the TEM and the EXAFS) or resistance to sulfur poisoning or both.

TABLE 3

Conversion and selectivity on n-hexane reaction at T = 753 K, $P_{H2}$ = 33.8 kPa, $P_n$–$C_6$ = 4.2 kPa after 75 min on stream on fresh and sulfided catalysts.

| Catalyst | % Conv. | $C_1$ | $C_2$-$C_5$ | $C_6=$ | Bz | $S_{Bz}$ | $R^a$ |
|---|---|---|---|---|---|---|---|
| Low Conversion | | | | | | | |
| Pt | 10.3 | 0.6 | — | 4.4 | 5.3 | 0.51 | |
| S, Pt | 7.4 | — | — | 6.2 | 1.2 | 0.16 | 0.022 |
| 0.70 Pt—Ni | 8.1 | 0.5 | — | 2.9 | 4.7 | 0.58 | |
| S, 0.70 Pt—Ni | 8.1 | — | — | 6.9 | 1.2 | 0.15 | 0.083 |
| 0.53 Pt—Ni | 6.3 | 0.4 | — | 2.8 | 3.1 | 0.49 | |
| S, 0.53 Pt—Ni | 11.7 | — | — | 10.2 | 1.5 | 0.13 | 0.12 |
| 0.44 Pt—Ni | 5.4 | 0.4 | — | 2.4 | 2.6 | 0.48 | |
| S, 0.44 Pt—Ni | 14.0 | 0.2 | — | 10.7 | 3.1 | 0.22 | 0.22 |

TABLE 3-continued

Conversion and selectivity on n-hexane reaction at T = 753 K, $P_{H2}$ = 33.8 kPa, $P_n$–$C_6$ = 4.2 kPa after 75 min on stream on fresh and sulfided catalysts.

| Catalyst | % Conv. | $C_1$ | $C_2$-$C_5$ | $C_6=$ | Bz | $S_{Bz}$ | $R^a$ |
|---|---|---|---|---|---|---|---|
| High Conversion | | | | | | | |
| Pt | 39.6 | 4.8 | — | — | 34.8 | 0.88 | |
| S, Pt | 58.0 | 0.7 | 0.5 | 12.7 | 44.1 | 0.76 | 0.018 |
| 0.70 Pt—Ni | 39.8 | 5.3 | 0.3 | 0.1 | 34.1 | 0.86 | |
| S, 0.70 Pt—Ni | 53.1 | 0.8 | 0.6 | 11.5 | 40.2 | 0.76 | 0.064 |
| 0.53 Pt—Ni | 54.4 | 7.5 | 0.4 | — | 46.5 | 0.85 | |
| S, 0.53 Pt—Ni | 55.1 | 1.1 | 0.9 | 12.2 | 40.9 | 0.74 | 0.077 |
| 0.44 Pt—Ni | 56.1 | 9.0 | 1.0 | — | 46.1 | 0.82 | |
| S, 0.44 Pt—Ni | 61.4 | 4.5 | 3.4 | 9.2 | 44.3 | 0.72 | 0.16 |

[a]This is the relative activity of the sulfided catalyst based on conversion per unit mass of catalyst.

The X-ray absorption fine structure (EXAFS) test is an X-ray absorption spectroscopy test for particle size and composition, as disclosed by Teo in the text "EXAFS: Basic Principles and Data Analysis" Springer-Verlag, Berlin, 1986). The EXAFS and catalytic hydrogenolysis test reaction demonstrate that the Pt—Ni clusters in KL-zeolite have a unique phase which is not the stoichiometric intermetallic compound PtNi which is often formed in larger particles, see J. Lercher et al, *J. Catalysis*, (1990) 122,406.

The invention claimed is:

1. A sulfur-tolerant catalyst comprising a first metal selected from the group consisting of platinum, rhodium and palladium, and a second metal comprising nickel, wherein the atomic ratio of said first metal to said second metal is about 2.3:1 to about 0.8:1, said first metal and said second metal form a cluster less than 13 angstroms in size, and both metals are supported within the pores of an L-zeolite support in basic form.

2. A catalyst according to claim 1 wherein said first metal is platinum and said second metal is nickel.

3. A catalyst according to claim 1 wherein said support is KL-zeolite.

4. Composition according to claim 1 wherein said first metal and said second metal form a cluster less than 13 Angstroms in size.

5. A catalyst according to claim 4 wherein substantially all of said second metal in said composition is in said clusters and substantially none of said second metal forms a separate phase.

6. Method of preparing a catalyst composition which comprises coimpregnating a nonacidic L-zeolitic support with a first metal selected from the group consisting of platinum, rhodium and palladium, and a second metal comprising nickel, wherein the atomic ratio of said first metal to said second metal is about 2.3:1 to about 0.8:1.

7. Method of reforming aliphatic hydrocarbons which comprises contacting said hydrocarbons under reforming conditions with a catalyst comprising the composition of claim 1.

8. Method of aromatizing aliphatic hydrocarbons by contacting said hydrocarbons under aromatizing conditions with a catalyst comprising the composition of claim 1.

9. Method of dehydrogenating aliphatic hydrocarbons by contacting said hydrocarbons under dehydrogenation conditions with a catalyst comprising the composition of claim 1.

\* \* \* \* \*